(12) United States Patent
Reinhart et al.

(10) Patent No.: US 8,057,310 B2
(45) Date of Patent: Nov. 15, 2011

(54) INTEGRATED DAMPER AND STARTER RING GEAR FOR A HYBRID VEHICLE

(75) Inventors: Timothy J. Reinhart, Brownsburg, IN (US); Grantland I. Kingman, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 12/238,528

(22) Filed: Sep. 26, 2008

(65) Prior Publication Data

US 2010/0081510 A1    Apr. 1, 2010

(51) Int. Cl.
*F16D 3/06* (2006.01)
(52) U.S. Cl. .................................. 464/68.8; 464/68.92
(58) Field of Classification Search ...... 464/68.1–68.92, 464/67.1; 74/411; 903/904
See application file for complete search history.

(56) References Cited

U.S. PATENT DOCUMENTS

| 5,415,261 | A  | * | 5/1995  | Friedmann ........... 192/70.17 |
| 5,558,579 | A  |   | 9/1996  | Tsuchiya et al. |
| 6,575,838 | B2 | * | 6/2003  | Jackel et al. ............ 464/68.92 |
| 2008/0207338 | A1 | * | 8/2008  | Mende et al. ............. 464/68.1 |
| 2009/0253550 | A1 | * | 10/2009 | Reinhart et al. ............... 477/3 |

FOREIGN PATENT DOCUMENTS

| DE | 4418390 A1    | 12/1994 |
| DE | 69400988 T2   | 3/1997  |
| DE | 19820503 A1   | 11/1999 |
| DE | 102004050731 A1 | 4/2006 |

* cited by examiner

*Primary Examiner* — Aaron Dunwoody
(74) *Attorney, Agent, or Firm* — Quinn Law Group, PLLC

(57) ABSTRACT

A vehicle assembly includes an engine having a damper assembly secured to the engine. The damper assembly includes a ring gear. A hybrid transmission having an input shaft is mounted on the mounting shaft of the damper assembly. The damper assembly includes an engine face plate and a transmission face plate secured to the engine face plate. The ring gear is secured to at least one of the transmission face plate and the engine face plate.

16 Claims, 4 Drawing Sheets

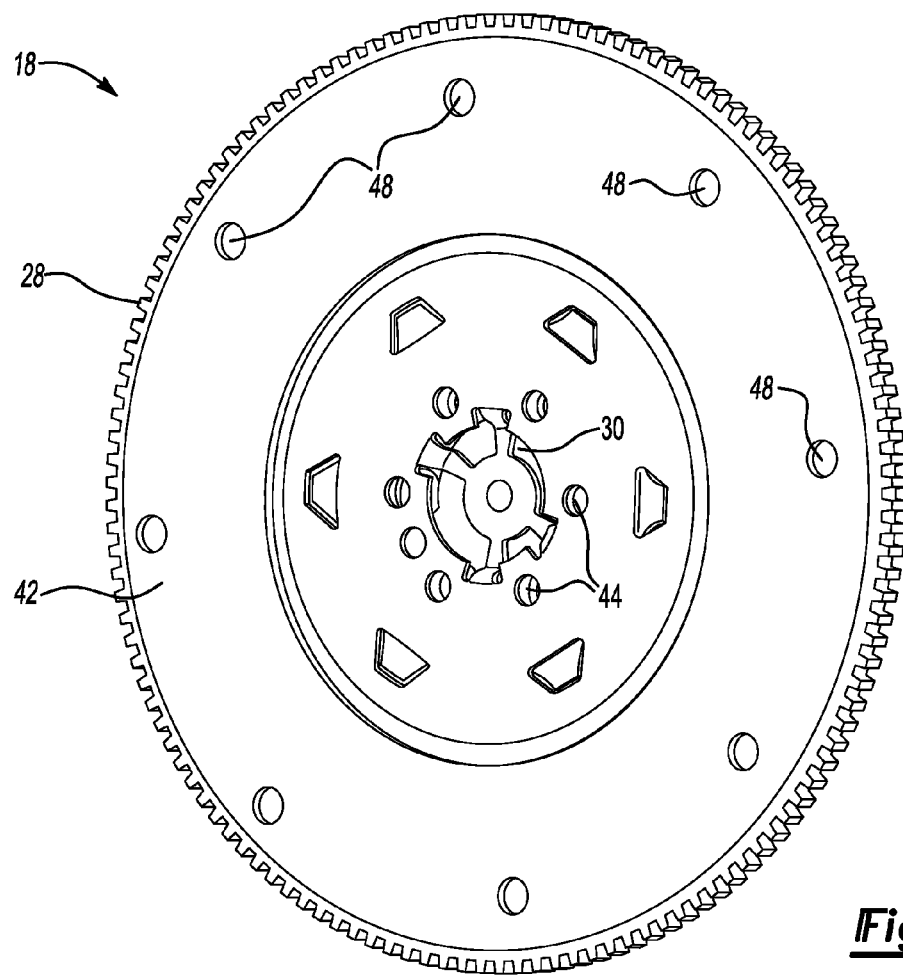
Fig-3
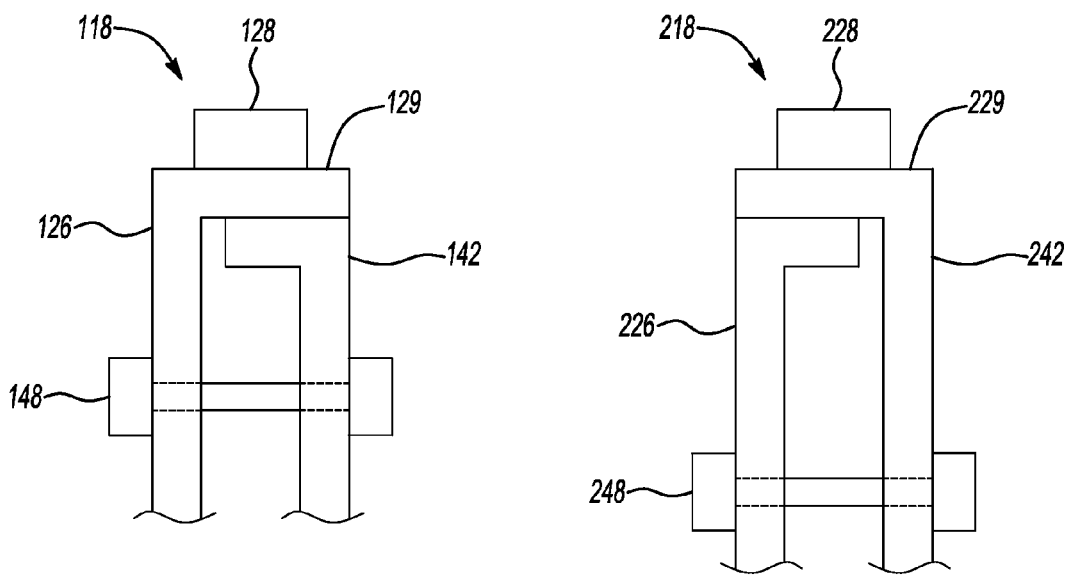
Fig-6
Fig-7

INTEGRATED DAMPER AND STARTER RING GEAR FOR A HYBRID VEHICLE

TECHNICAL FIELD

The present invention relates, generally, to hybrid vehicle, and more specifically, for a damper and starter ring gear assembly for the hybrid vehicle.

BACKGROUND OF THE INVENTION

Vehicles having traditional transmissions, i.e. those powered by a combustion engine alone, require the use of a flywheel mounted on the engine. In addition to being required for vehicle operation, the flywheel is used at an engine assembly plant for starting the engine to confirm the engine will run properly. This is typically done prior to sending the engine to a vehicle assembly location for final assembly.

Vehicles having hybrid transmissions do not require a flywheel for vehicle operation. However, a flexplate is still included as part of the assembly to provide a starter ring gear for start capability at the engine assembly plant. The engine and flexplate are then assembled by bolting the flexplate to a transmission damper at the vehicle assembly location. The transmission damper is typically mounted within the transmission housing for the hybrid transmission, thus making assembly of the flexplate to the damper difficult.

SUMMARY OF THE INVENTION

An arrangement for a damper assembly and ring gear for a vehicle is desired. A vehicle assembly includes an engine having a damper assembly secured to the engine. The damper assembly includes a ring gear. A hybrid transmission having an input shaft is mounted on the mounting shaft of the damper assembly.

The damper assembly includes an engine face plate and a transmission face plate secured to the engine face plate. At least a portion of the engine face plate is spaced apart from the transmission face plate such that an internal opening is defined. The ring gear is secured to at least one of the transmission face plate and the engine face plate. The damper assembly includes a flange positioned within the internal opening. A plurality of springs is located between the flange and one of the transmission face plate and the engine face plate to reduce relative rotational movement.

The above features and advantages, and other features and advantages of the present invention will be readily apparent from the following detailed description of the preferred embodiments and best modes for carrying out the present invention when taken in connection with the accompanying drawings.

BRIEF DESCRIPTION OF THE DRAWINGS

FIG. 3 a schematic perspective front view of the damper assembly of FIGS. 1 and 2;

FIG. 6 is a schematic fragmentary side view of an another embodiment for a damper assembly and ring gear of FIG. 1; and FIG. 7 is a schematic fragmentary side view of a third embodiment for a damper assembly and ring gear of FIG. 1.

DESCRIPTION OF THE PREFERRED EMBODIMENTS

Figure 1:
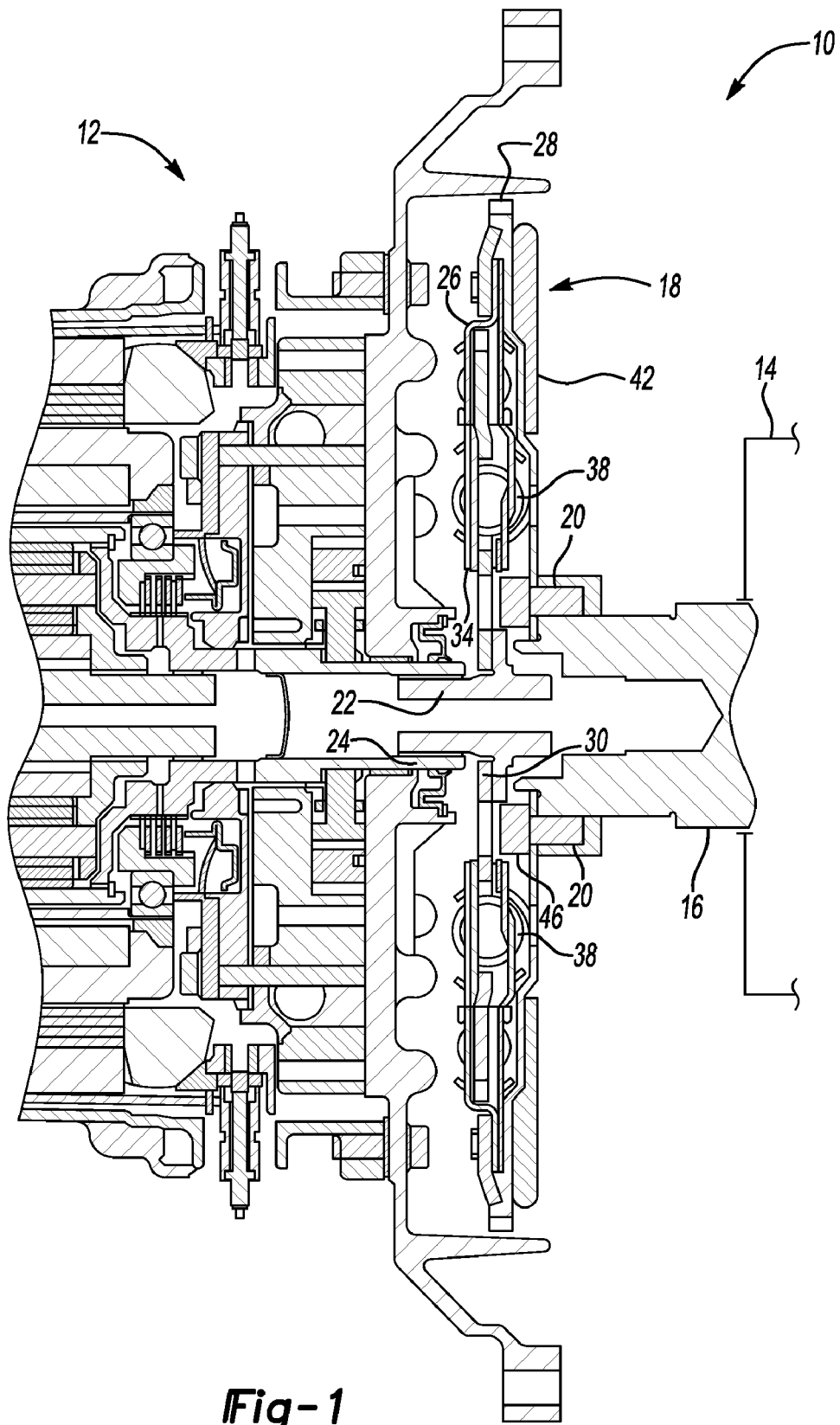
FIG. 1 is a schematic cross-sectional view of a damper assembly mounted on a hybrid transmission for use with an automotive vehicle.

Referring to the Figures, wherein like reference numbers refer to the same or similar components throughout the several views, FIG. 1 schematically illustrates an automotive vehicle 10 having a hybrid transmission 12 and an engine 14. The engine 14 includes an engine crank 16 and a damper assembly 18. The damper assembly 18 is bolted to the engine crank 16 with bolts 20.

The damper assembly 18 is preferably a non-fluid filled damper, which is bolted directly to the engine crank 16. In this embodiment, damper assembly 18 is a spring isolator that has two stages of spring rates. Those having ordinary skill in the art will recognize various types of dry dampers which may be used within the scope of the claims.

The damper assembly 18 includes a mounting shaft 22 which is preferably an externally splined shaft protruding from the damper assembly 18. the mounting shaft 22 is may also be referred to as the damper hub spline. The mounting shaft 22 protrudes rearward from the damper assembly 18. Directions relative to the vehicle orientation may be used throughout the description regarding location of the components within the vehicle. That is, when assembled within the vehicle 10 the mounting shaft 22 extends rearward or toward the rear of the vehicle 10 from the damper assembly 18. The externally splined mounting shaft 22 is mounted within a transmission input shaft 24. The transmission input shaft 24 is preferably an internally splined shaft to correspond to the externally splined mounting shaft 22 on the damper assembly 18.

Figure 2:
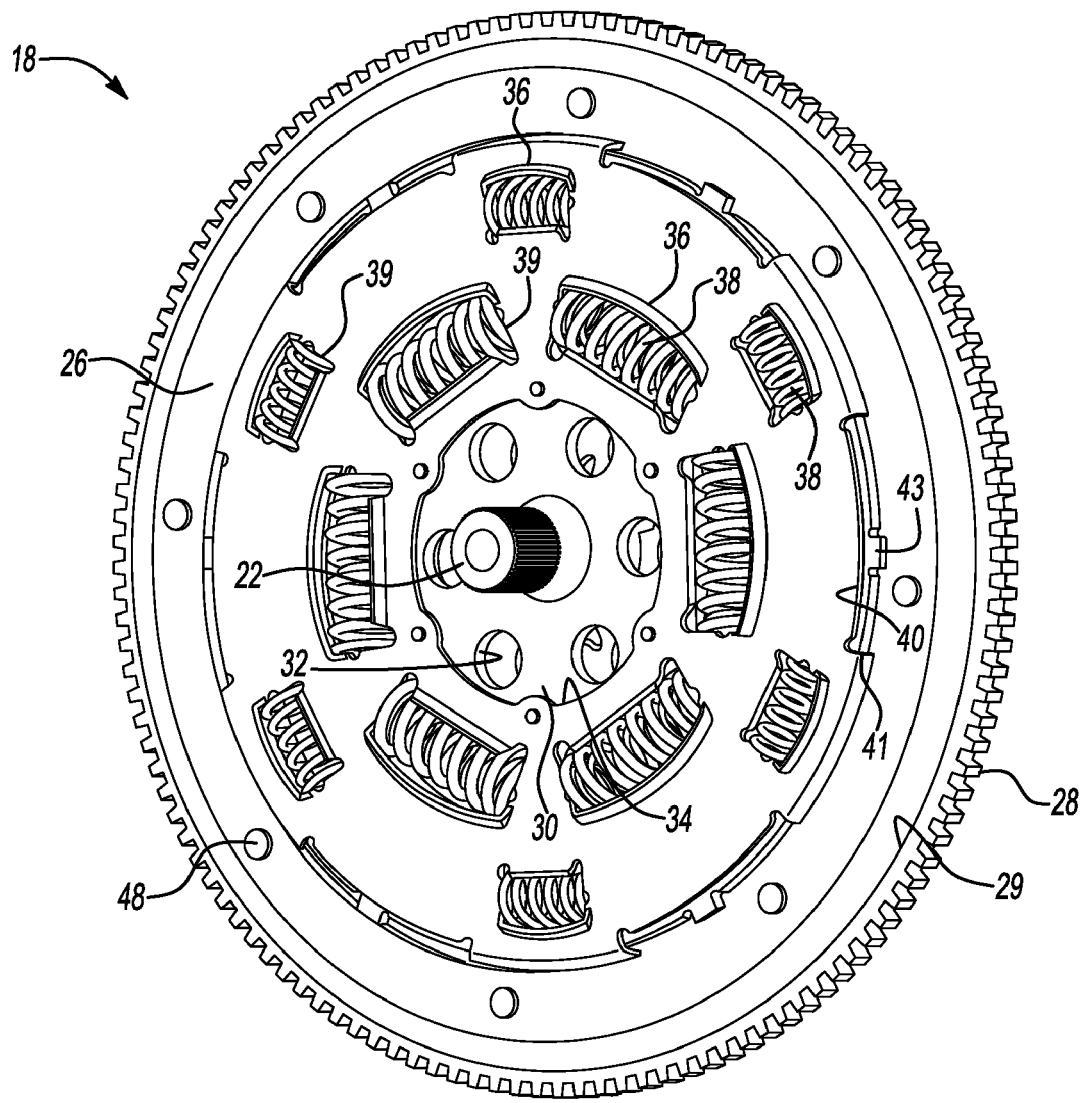
FIG. 2 a schematic perspective rear view of the damper assembly of FIG. 1.

FIG. 2 is a perspective rear view of the damper assembly 18. In other words, the damper assembly 18 is shown as would be seen from the rear of the vehicle 10 looking forward. The damper assembly 18 includes a transmission face plate 26 and a ring gear 28 mounted at an external edge 29 thereof. The transmission face plate 26 has a generally annular shape defining an opening 34. The mounting shaft 22 extends, through the opening 34, from a flange 30. The flange 30 defines a plurality of flange apertures 32 which surround the mounting shaft 22 and are accessible through the opening 34. The flange apertures 32 are larger than the heads of the bolts 20 (shown in FIG. 1) which are used to secure the damper assembly 18 to the engine crank 16. The size of the flange apertures 32 allows the bolts 20 to pass through the flange apertures 32 and provide access for assembly of the damper assembly 18 on the engine crank 16. The center opening 34 on the transmission face plate 26 allows access to the flange 30, the flange apertures 32 and the mounting shaft 22 may be accessed.

The transmission face plate 26 also defines a plurality of spring pockets 36 through which a plurality springs 38 may partially extend. Movement of the transmission face plate 26 relative to the flange 30 places pressure on the springs 38 with the sides 39 of the spring pockets 36. Because the transmission face plate 26 is moving rotationally relative to the flange 30, the flange 30 places pressure on an opposing end of each of the springs 38. The springs 38 flex, or elastically deform as a result of the relative movement between the flange 30 and the transmission face plate 26. The rotational movement of the transmission face plate 26 occurs from vibrations passed from the engine crank 16. The springs 38 flex to absorb the resulting movement. Thus, the springs 38 dampen vibrations between the engine 14 and the transmission 12. The springs 38 may be of varying sizes to provide multiple spring rates. In the embodiment shown there are two different sizes of springs 38, each size providing different spring rates. One skilled in the art would know the desired spring rates to apply for the individual vehicle application.

Slots 40 in the transmission face plate 26 receive tabs 43 extending radially from the flange 30. The slots 40 are greater in length than the tabs 43 to allow relative motion between the flange 30 and the transmission face plate 26. Further, the circumferential length of the slots 40 are used to create stops 41 for relative motion between the flange 30 and the transmission face plate 26. The stops 41 prevent deformation of the springs 38 beyond the designed elastic limitations. That is, the circumferential distance of the slots 40 in relation to the width of the tabs 43 determines the amount of relative motion between the flange 30 and the transmission face plate 26. The ends of the slots 40 act as stops 41 for the tabs 43.

FIG. 3 is a schematic perspective front view of the damper assembly 18. In other words, the damper assembly 18 is shown as would be seen from the front of the vehicle looking rearward. An engine face plate 42 for the damper assembly 18 is shown. The engine face plate 42 is attached to the transmission face plate 26 (shown in FIG. 2) and the ring gear 28 is located at the external edge of the engine face plate 42. Plate fasteners 48 may be located on the engine face plate 42 for securing the engine face plate 42 to the transmission face plate 26. In the embodiment shown, the plate fasteners 48 are rivets.

Additionally, a plurality of mounting apertures 44 are defined by the engine face plate 42. The mounting apertures 44 allow the bolts 20 (shown in FIG. 1) to pass through for securing the damper assembly 18 to the engine crank 16. The mounting apertures 44 do not allow the 46 heads (shown in FIG. 1) of the bolts 20 to pass through. As shown in FIG. 1, when assembled within the vehicle, the heads 46 of bolts 20 are forward of the flange 30 and rearward of the engine face plate 42. Thus, the engine face plate 42 and transmission face plate 26 are fixed relative to the engine crank 16 and the flange 30 can rotate relative to the engine face plate 42, the transmission face plate 26 and the engine crank 16.

Figure 4:
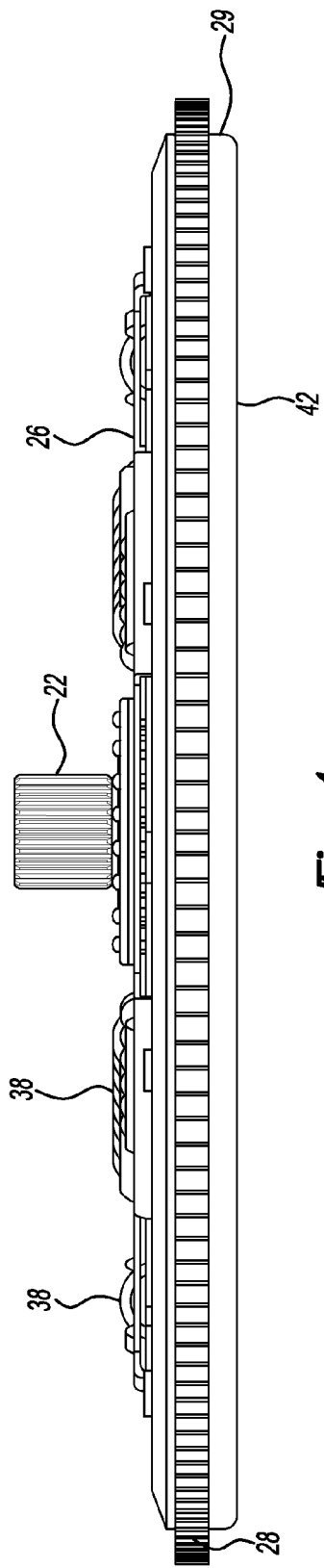
FIG. 4 a schematic side view of the damper assembly of FIGS. 1-3.
Figure 5:
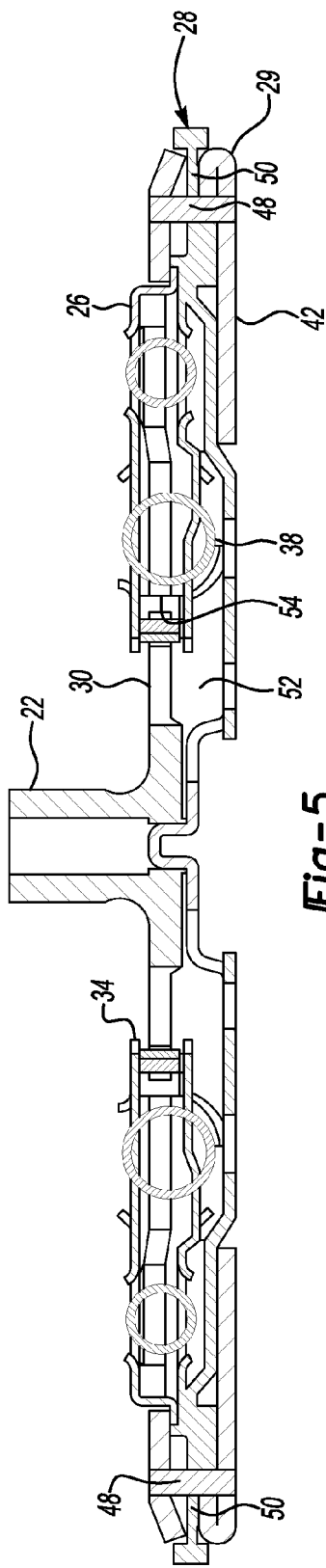
FIG. 5 a schematic cross-sectional side view of the damper assembly of FIGS. 1-4.

FIG. 4 is a schematic perspective side view of the damper assembly 18 showing the ring gear 28 and FIG. 5 illustrates as cross-sectional side view of the damper assembly 18. The ring gear 28 has an annular shape with an inwardly protruding mounting flange 50. The mounting flange 50 is mounted between the transmission face plate 26 and the engine face plate 42 at the external edge 29 of the damper assembly 18. The plate fasteners 48 secure the ring gear 28 to the engine face plate 42. Other arrangements for securing the ring gear 28 to the transmission face plate 26 and the engine face plate 42 may also be used. These arrangements may include, but are not limited to, integrally forming the ring gear 28 on the transmission face plate 26 or the engine face plate 42 or having a press fit between the ring gear 28 and the transmission face plate 26 or the engine face plate 42. One skilled in the art would know the desired arrangement for securing the ring gear on the transmission face plate 26 or the engine face plate 42.

At an engine assembly plant, the damper assembly 18 is bolted to the engine crank 16 (shown in FIG. 1). The ring gear 28 is used to start the engine 14 for test operation. The assembled engine 14 and damper assembly 18 are then sent to a final vehicle assembly where the mounting shaft 22 is assembled within the transmission 12. Additionally, the damper assembly 18 with the ring gear 28 can be used to cold start the engine 14 for the vehicle 10 in cold weather. This is typically required in weather below 0 degrees Fahrenheit.

FIG. 5 illustrates as cross-sectional side view of the damper assembly 18. The transmission face plate 26 and the engine face plate 42 define an internal space 52 for clearance of the heads of bolts 20. The flange 30 is located between transmission face plate 26 and the engine face plate 42. The flange 30 defines spring pockets 54 through which the springs 38 extend. Similar to the transmission face plate 26 the sides of the spring aperture 54 place pressure of the springs 38 when the flange 30 moves relative to the transmission face plate 26. The springs 38 deform to reduce the relative movement between the flange 30 and the transmission face plate 26 and dampen vibrations between the engine 14 and the transmission 12.

FIG. 6 is another embodiment for mounting the ring gear 128 on the damper assembly 118. The ring gear 128 has an interference fit with the transmission face plate 126 at the external edge 129. The transmission face plate 126 and the engine face plate 142 are secured together with fasteners 148.

FIG. 7 is a third embodiment for mounting the ring gear 228 on the damper assembly 218. The ring gear 28 has an interference fit with the engine face plate 242 at the external edge 229 of the damper assembly 218. The engine face plate 242 and the transmission face plate 226 are secured together with fasteners 248.

While the best modes for carrying out the invention have been described in detail, those familiar with the art to which this invention relates will recognize various alternative designs and embodiments for practicing the invention within the scope of the appended claims.

The invention claimed is:

1. A damper assembly configured to connect an engine crankshaft and a transmission input member, comprising:
    an engine face plate configured to be fixed to the engine crankshaft without relative rotation therebetween;
    a transmission face plate secured to the engine face plate such that the engine face plate and the transmission face plate are not rotatable relative to one another and an internal opening is defined therebetween;
    a ring gear secured to at least one of the transmission face plate and the engine face plate;
    a flange configured to connect to the transmission input member without relative rotation therebetween and positioned within the internal opening and at least partially rotatable relative to the engine face plate and the transmission face plate; and
    a plurality of springs located between and operatively connecting the flange and one of the transmission face plate and the engine face plate to reduce relative rotational movement thereof; the ring gear thereby being connected to the engine crankshaft by the engine faceplate without torque flow from the ring gear to the crankshaft being through the plurality of springs when the engine face plate is connected to the engine crankshaft.

2. The damper assembly of claim 1, wherein the ring gear has an annular shape.

3. The damper assembly of claim 1, wherein a plurality of fasteners secure the engine face plate to the transmission face plate, and wherein the ring gear further comprises a mounting flange defining a plurality of fastener apertures through which the plurality of fasteners extend.

4. A vehicle assembly comprising:
    an engine having a crankshaft;
    a damper assembly having a mounting shaft and secured to the crankshaft, wherein the damper assembly includes a ring gear mounted thereon; wherein the damper assembly further includes a plurality of springs and is configured so that the ring gear rotates commonly with the crankshaft without torque flow from the ring gear to the crankshaft being through the plurality of springs and with torque flow from the crankshaft to the mounting shaft being through the plurality of springs; and a hybrid transmission having an input shaft mounted on the mounting shaft of the damper assembly.

5. The vehicle of claim 4, wherein the damper assembly further comprises;

an engine face plate;

a transmission face plate secured to the engine face plate such that an internal opening is defined therebetween;

a flange extending from the mounting shaft and positioned within the internal opening; and a plurality of springs located between the flange and one of the transmission face plate and the engine face plate to reduce relative rotational movement thereof.

6. The vehicle of claim 5, wherein the ring gear is secured to an external edge of at least one of the transmission face plate and the engine face plate.

7. The vehicle of claim 6, wherein the ring gear has an annular shape.

8. The vehicle of claim 6, wherein a plurality of fasteners secure the engine face plate to the transmission face plate, and wherein the ring gear further comprises a mounting flange defining a plurality of fastener apertures through which the plurality of fasteners extend.

9. The vehicle of claim 4, wherein the ring gear has an interference with the transmission face plate.

10. The vehicle of claim 4, wherein the ring gear has an interference fit with the engine face plate.

11. The engine assembly of claim 10 wherein the ring gear has an annular shape.

12. An engine assembly comprising:

an engine having a crankshaft;

a damper assembly having an engine face plate secured to rotate with the crankshaft without relative rotation between the engine face plate and the crankshaft, wherein the damper assembly includes a ring gear mounted thereon such that the ring gear rotates with the engine face plate and with the crankshaft without relative rotation therebetween, wherein the damper assembly further comprises:

a transmission face plate secured to the engine face plate such that an internal opening is defined therebetween;

a flange positioned within the internal opening; and a plurality of springs located between the flange and one of the transmission face plate and the engine face plate to reduce relative rotational movement thereof.

13. The engine assembly of claim 12, wherein the ring gear is secured to an external edge of at least one of the transmission face plate and the engine face plate.

14. The engine assembly of claim 13 wherein a plurality of fasteners secure the engine face plate to the transmission face plate, and wherein the ring gear further comprises a mounting flange defining a plurality of fastener apertures through which the plurality of fasteners extend.

15. The engine assembly of claim 12 wherein the ring gear has an interference fit with the transmission face plate.

16. The engine assembly of claim 12 wherein the ring gear has an interference fit with the engine face plate.

* * * * *